United States Patent [19]

Dumont et al.

[11] 4,104,886
[45] Aug. 8, 1978

[54] FLOAT FOR USE IN LAYING SUBMARINE PIPELINES

[75] Inventors: Michel Paul Dumont, Paris; Jacques Edouard Lamy, Fontenay-aux-Roses, both of France

[73] Assignee: Compagnie Generale pour les Developpements Operationnels des Richesses Sous-Marines "C. G. Doris", Paris, France

[21] Appl. No.: 801,362

[22] Filed: May 27, 1977

[30] Foreign Application Priority Data

May 31, 1976 [FR] France .................. 76 16329
Jul. 13, 1976 [FR] France .................. 76 21430

[51] Int. Cl.² .............................................. F16L 1/00
[52] U.S. Cl. ...................................... 61/112; 114/267
[58] Field of Search ............... 61/112, 108, 107, 109, 61/110, 113, 101, 92; 114/264, 267

[56] References Cited

U.S. PATENT DOCUMENTS

| 3,136,133 | 6/1964 | Perret | 61/112 |
| 3,855,809 | 12/1974 | Westling | 61/101 |
| 4,011,729 | 3/1977 | Kermel | 61/112 |
| 4,037,425 | 7/1977 | Berg | 61/112 |

FOREIGN PATENT DOCUMENTS 647,734 10/1962 Italy .......................... 61/112

*Primary Examiner*—Jacob Shapiro
*Attorney, Agent, or Firm*—Laurence R. Brown

[57] ABSTRACT

A float device for use in laying a submarine pipeline from a launching base, comprising one or more tubes containing a liquid less dense than water, such as a hydrocarbon, and fixed to the pipeline so as to form therealong a plurality of compartments isolated from each other and each communicating with the sea via an opening or a pipe opening towards the bottom. Means may be provided for opening in each compartment a passage opening towards the top and for recovering the less dense liquid, driven by the water, to the outlet of said passages, or even for releasing the tube or tubes from the pipeline.

17 Claims, 12 Drawing Figures

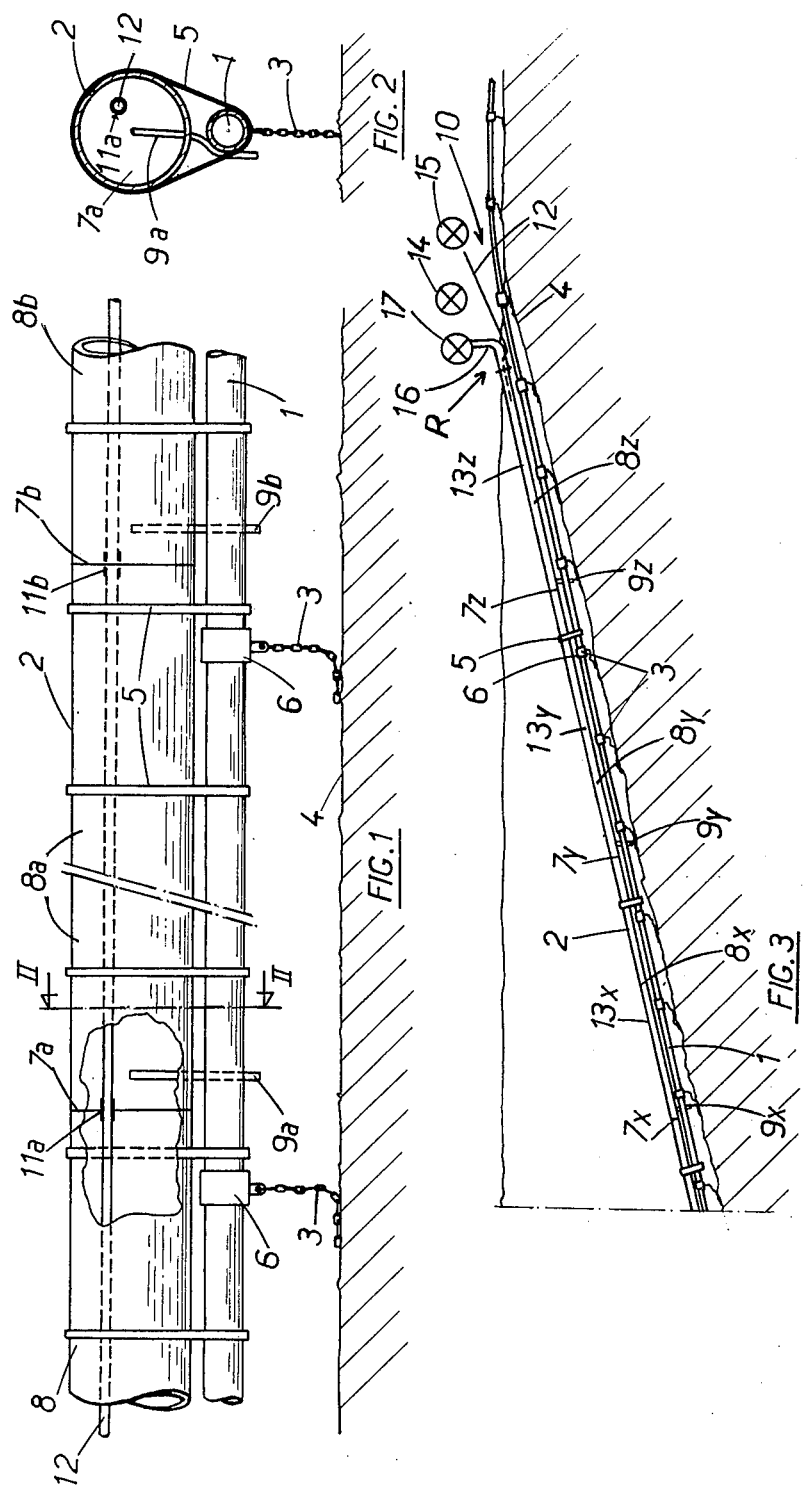

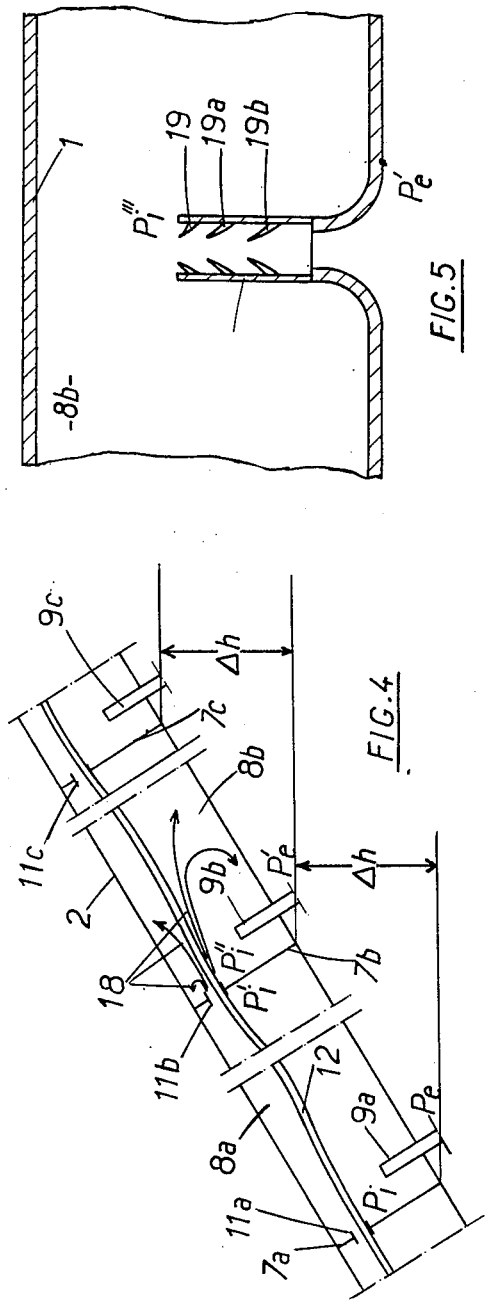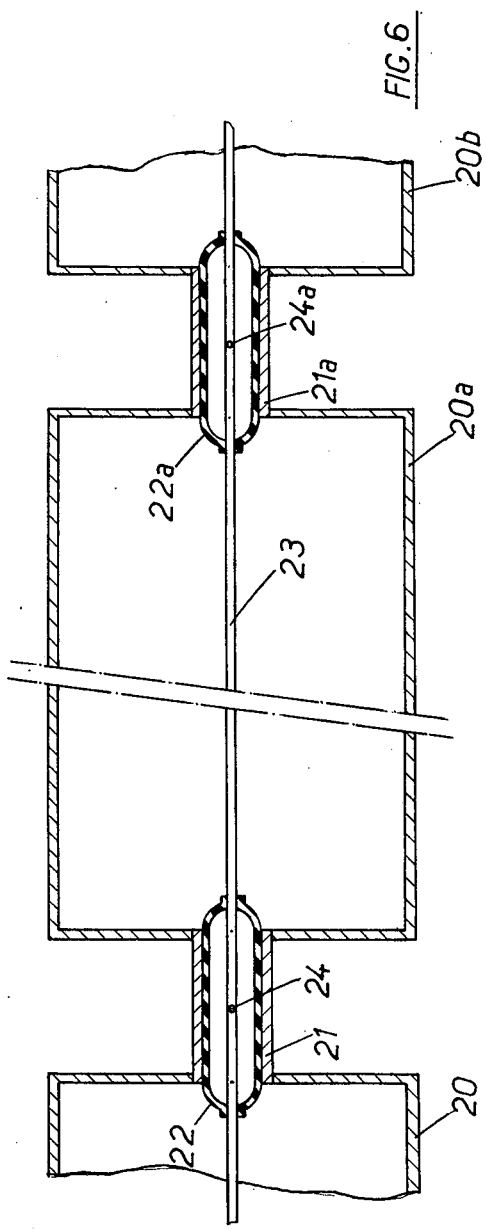

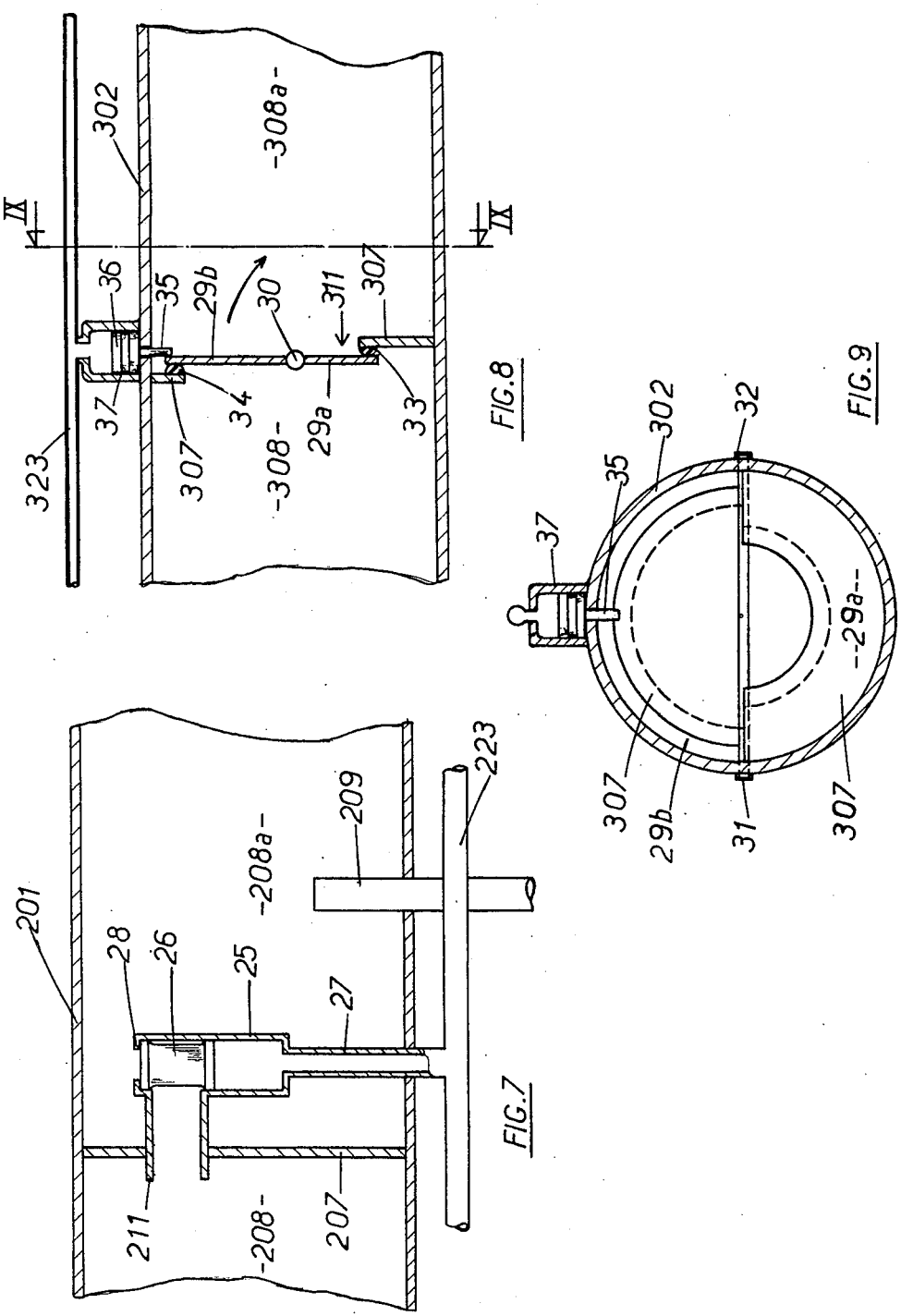

FLOAT FOR USE IN LAYING SUBMARINE PIPELINES

This invention relates to a pipeline, such as an oil duct or a gas duct, submerged in a body of water, and more particularly to a float device particularly useful in the laying of such a pipeline.

The laying can be carried out either by pulling from the bank towards the open sea or by submersion from the surface of the water from a floating device. In either case, the pipeline is usually supported by means of a flotation device, for example floats, which give it a positive buoyancy, and is provided with ballasting cables or chains forming trail-ropes which rest on the bed of the body of water. The pipeline thus floats in the midst of water. This enables the effort to be exerted to be appreciably reduced when pulling from the bank since the friction of the trail-ropes on the bed is less than that which would have to be overcome to draw the pipeline directly on the bed. When it is completely in place and is to be put into service (for example for the transport of petroleum or natural gas), it is usually advantageous to give it a negative buoyancy so that it will come to rest on the bed.

It has already been proposed, notably in U.S. patent Application No. 690,873, of May 28, 1976, to form the flotation device as a tube extending right along the pipeline and filled with a liquid of low density such as a hydrocarbon. In the known embodiments, the tubular float is not in communication with the sea so that it is subjected interiorly to the pressure of a liquid of low density, thus to a pressure below the external pressure, which tends to crush the tube. In order to resist this pressure, the tubular float must have a considerable thickness if the pipeline is submerged at a great depth. In order to cause the pipeline to descend to the bed when it is finally placed in position, the tubular float is weighted by introducing a denser liquid thereinto, for example by means of soft water introduced through an end of the tube.

An object of the invention is to enable the production of a tubular float having a thin wall and useful for laying a pipeline at great depth.

It is also an object of the invention to enable the production of floats with thin walls and useful for laying pipelines at great depth and provided with means enabling a negative buoyancy to be given automatically to the pipeline in order that it may rest on the bed.

A still further object of the invention is to enable the production of floats having thin walls filled with a liquid of low density and provided with means enabling a negative buoyancy to be given to the pipeline while recovering the liquid of low density.

According to one aspect of the invention, a float device comprises a continuous tube fixed to the pipeline and divided by transverse partitions into compartments which are filled with a liquid less dense than water and each of which is in communication with the sea by an opening or a pipe opening towards the base.

According to another aspect of the invention, a float device comprises one or more tubes fixed to the pipeline and forming therealong a plurality of compartments which are filled with a liquid less dense than water and which each are in communication with the sea by an opening or a pipe opening towards the base, means being provided for opening in each compartment a passage opening towards the top and for recovering said liquid, driven by the water, at the outlet of these passages or for freeing the tube or tubes from the pipeline.

The pressure prevailing in the interior of each compartment, at the level of the opening or of the pipe, is equal to the external pressure at the depth of immersion thereof, so that the walls of the compartments are only subjected, at other levels, to a limited pressure differential. The length of the compartments will be selected, account being taken of the gradient of the submarine bed, so that the thin tube or tubes are able to withstand this pressure differential. When means are provided for opening in each compartment a passage opening towards the top, this passage will preferably be located at the end of the compartment which is highest during the laying of the pipeline, and the opening or pipe for communicating with the sea will be located at the other end, so that the liquid of low density will be driven automatically by the water entering by this opening or pipe.

In one embodiment, the float device comprises a tube which extends right along the pipeline and is divided into compartments by transverse partitions, and means are provided for controlling, from the launching base situated on shore or from the floating device, the opening of passages for putting the compartments into communication, so that the water progressively occupies the latter while driving the less dense liquid towards an end of the tube situated on the shore or the floating device.

The passages may pass through the partitions and be obturated by inflatable joints which communicate with a pilot tube opening at the launching base, means being provided at this base for maintaining at will this pilot tube pressurised or depressurised. These means may comprise a device enabling the pilot tube to be filled with a liquid denser than water or for aspirating this liquid therefrom.

As a variant, the passages passing through the partitions could be closed by slide valves controlled hydraulically, pneumatically or electrically.

These passages could also be replaced by a device for tearing, destroying or collapsing the partitions. Such a device could consist of:

valves, for example of the butterfly type, in hydraulic disequilibrium, collapsing under the pressure, assisted or not by springs, when the release of an unlocking device is actuated from the launching base;

or a pyrotechnic device destroying the partitions when a fuse is lit from the launching base.

According to another embodiment, the liquid of low density forced by the water from each compartment is recovered at the outlet of the passage in a bag of elastomeric material fixed to the compartment by releasable links actuable from the launching base so that the bottle may rise to the surface.

The following description with reference to the drawings, given by way of non-limiting example, will enable the method of carrying the invention into effect to be better understood, the particulars comprised in both the drawings and the text forming, it will be understood, part of said invention.

FIG. 1 is a view in elevation, partly broken away, of part of a submarine pipeline provided with a tubular float according to the invention.

FIG. 2 is a section on the line II—II of FIG. 1.

FIG. 3 is a schematic view on a smaller scale, showing the weighting of the tubular float after the laying of the pipeline.

FIG. 4 is a schematic view showing the flow of light liquid during the weighting of the tubular float.

FIG. 5 is a section on a larger scale of part of a compartment of a tubular float, showing another way of forming a pipe for connecting the interior of the compartment with the sea.

FIG. 6 shows one form of the tubular float and the pilot tube, seen in longitudinal section on the scale of FIG. 5.

FIGS. 7, 8 and 10 are views in longitudinal section of part of the tubular float of FIG. 1, showing on another scale variants of the intercommunicating device.

FIG. 9 is a section on the line IX—IX of FIG. 8.

Figure 10:
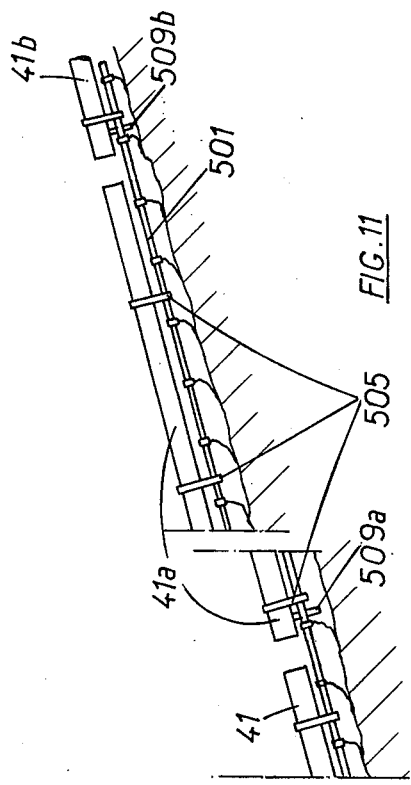

FIG. 1 shows a pipeline 1 lightened by a tubular float 2 and weighted by a plurality of ballasting chains 3 which act as trail-ropes by resting a more or less large part of their length on the bed 4 of the sea. The tubular float 2 is continuous and extends right along the pipeline 1; it is fixed above the latter by a plurality of bands of steel strip 5 distributed along its length, and the chains 3 are fixed to the pipeline 1 by collars 6.

The tubular float 2 is divided by transverse partitions such as 7a, 7b into compartments such as 8, 8a, 8b which are filled with a liquid less dense than sea water and immiscible therewith, for example a hydrocarbon, and which are each in communication with the sea via a pipe such as 9a, 9b opening towards the bottom and located near to the partition 7a, 7b the furthest from the launching base 10 of the pipeline (see FIG. 3).

The partitions, such as 7a and 7b, which separate the compartments are pierced with openings such as 11a, 11b through which passes a tube 12 of elastomeric material (see also FIG. 4) sufficiently flexible to close these openings when it is maintained under pressure as hereinafter explained, and to free an appreciable area of passage through the openings when it is depressurised.

The laying of the pipeline is effected, in known manner, by means of a cable (not shown), attached to the front end of the pipeline and drawn by a tug (not shown) towards the open sea from the bank R where the launching base 10 is established.

The pipeline 1 is composed of prefabricated sections, provided with collars 6 and chains 3 and stored on land in the vicinity of the launching base 10. Each new section is added (for example by welding) to the rear end, still on shore, of the part of the pipeline already submerged. The tubular float 2 is also composed of prefabricated sections such as 13x, 13y, 13z (FIG. 3) each provided at its rear end with a partition 7x, 7y, 7z. The elastomeric tube 12 is threaded into these sections through the openings in the partitions. Each section of the tubular float is fixed by means of steel strip bands 5 to the pipeline 1 and is filled, through its pipe such as 9x, 9y, 9z with a liquid less dense than sea water fed under pressure from a pipe 14 (see FIG. 3). The front end of each section is secured, for example by welding, to the rear end of the preceding section before the latter enters the water. During the course of laying the pipeline, the elastomeric tube 12 is connected to a compressed air pipe 15, which maintains it at a pressure above the pressure which prevails on the bed of the sea at the maximum depth of immersion of the pipeline 1. All the partitions such as 7a, 7b, 7c are thus closed in an impervious manner. The only opening of each compartment is thus the pipe such as 9a, 9b which puts it into communication with the sea.

If the liquid less dense than water is a hydrocarbon and if the fixing is done by welding, there is interposed between the hydrocarbon and the end of the compartment a separator plug similar to those described in the patent application referred to above, in order to avoid the risk of fire.

The pipeline 1 is thus submerged at a great depth. If the depth of immersion is for example 1900 meters, the pipeline would be made of thick tubes of 710 mm diameter and 40 mm thickness, and the float tube 2 of thin tubes of 1.53 m diameter and 6.25 mm thickness. The lower end of each compartment is subjected interiorly to the pressure of the sea at the depth of immersion of its pipe such as 9a, 9b. The upper end of each of these compartments will then be subjected interiorly to this same pressure less the pressure of the column of light liquid of a height equal to the difference between the levels of the two ends of the compartments, and exteriorly to a lower pressure (pressure of the sea at the depth of immersion) during the laying of the pipeline, the length of each section such as 13x, 13y, 13z, of the order of several hundred meters, being selected, account being taken of the gradient of the submarine bed, so that the thin tube can withstand this pressure difference.

Once the laying of the pipeline 1 is terminated (FIG. 3) the elastomeric tube 12 is disconnected from the pipe 15, so that it deflates and is depressurised with reference to the liquid pressure exerted on the exterior surface, thus exposing an appreciable section of passage through each opening. All the compartments are thus put into intercommunication and since the bed 4 of the sea slopes downwardly from the launching base 10 as shown in FIG. 3, the water progressively occupies the tubular float 2 and drives the light liquid which is recovered at the launching base 10 by means of a pipe 16 connected to the end of the tubular float 2 and to a pipe 17 connected to a reservoir not shown.

FIG. 4 illustrates the upward flow in the tube 2 of light liquid drived by the sea water. As has already been indicated, the static pressure $P_i$ at the base of a compartment 8a is, at rest, equal to the pressure $P_e$ of the sea at the depth of immersion of the pipe 9a, and the static pressure $P'_i$, at the upper part of this same compartment 8a is equal to this pressure $P_e$ less the pressure of the column of light liquid of height $\Delta h$. The interior static pressure $P''_i$, at the base of the compartment 8b is equal to the pressure $P'_e$ of the sea at the same level, that is to say to the pressure $P_e$ less the pressure of the column of sea water of height $\Delta h$. The static pressure $P'_i$ is thus greater than the static pressure $P''_i$, so that, when the pipe 12 exposes the openings in the partitions, the light fluid tends to flow from the compartment 8a into the compartment 8b as indicated by the arrows 18. Due to the effect of this hydraulic flow, the static pressure at the entrance to the pipe 9b will be nearly the same as the exterior pressure $P'_e$, so that escape of light fluid through this pipe 9b is little or nothing.

If nevertheless there are escapes towards the exterior, the pipes can be provided with non-return valves (not shown) or with hydrodynamic valves such as that shown in FIG. 5. Such a hydrodynamic valve comprises a series of deflectors of generally truncated form 19, 19a, 19b forming, in the direction of flow from the interior to the exterior, that many divergents having a gradient of section sufficiently great that the liquid streams strike the walls of the divergents with generation of eddies which augment the loss of pressure. If then the static pressure $P'''_{i}$ at the level of the interior end of the pipe 9b fluctuates above and below $P'_e$, the loss of pressure imposed by this pipe 9b on the flows of light liquid towards the exterior will be greater than that imposed on the flows of water towards the interior. The flow will thus tend to stabilise from the exterior to the interior.

FIG. 6 shows a variant in which the tubular float 101 is composed of a plurality of tubular elements such as 20, 20a, 20b each forming a compartment and interconnected by sections of tubes of smaller section such as 21, 21a which are normally closed by inflatable packings such as 22, 22a transversed by a pilot tube 23 pierced with holes such as 24, 24a each opening into one of the inflatable packings. As in the case of FIGS. 1 to 3, the pilot tube 23 is connected to a source of compressed air during the laying of the pipeline, such that the inflatable packings 22, 22a close the sections of tubes 21, 21a. Once the laying ends, the pilot tube 23 is connected to the atmosphere, so that the inflatable packings are depressurised and expose an appreciable section of passage through the sections of tubes.

FIG. 7 illustrates another variant of the device for intercommunicating the compartments. The partitions 207 of the tubular float 201 are transversed by sections of tubes 211 which each open laterally in the guideway 25 of a slide valve 26, an end of the guideway 25 being connected by a pipe 27 to the pilot tube 223 and its other end being formed with an inturned edge 28 and opening into the compartment 208a. In the position shown, the pilot tube 27 is connected to the source of compressed air which pushes the valve 26 against the inturned edge 28, thus closing the section of tube 211. When the end of the pilot tube is connected to atmosphere, the pressure prevailing in the compartment 208a repushes the valve 26 towards the pipe 27, thus exposing a section of passage of the section of tube 211.

FIGS. 8 and 9 show a form of intercommunication device consisting of a butterfly valve in hydraulic disequilibrium. The partition 307 is limited to a peripheral flange which, as can be seen from the drawing, has a greater radial dimension in its lower part than in its upper part and is normally closed by a valve 29 consisting of two half-discs 29a, 29b fixed to an axle 30 rotatably mounted in two bearings 31, 32 integral with the tubular float 202. The half-disc 29b has, as can be seen, a radius greater than the half-disc 29a. In the position shown, the valve closes in an impervious manner the large central opening 311 by bearing on the packings 33, 34 carried respectively by the lower and upper portions of the partition 307, and is maintained applied against these packings by a finger 35 integral with a piston 36 which slides in a cylinder 37 fixed to the tubular float 302 and connected to the pilot tube 323.

FIGS. 8 and 9 show the position of the piston 36, finger 35 and valve 29 when the pilot tube 323 is connected to a source of compressed air. When the pilot tube is connected to the free air once the laying of the pipeline is finished, the pressure in the compartment 308a urges the piston 36 to the bottom of the cylinder 37, the piston taking with it the finger 35. As has already been explained, the compartment 308 is at a higher pressure than the compartment 308a in the vicinity of the partition 307. The overpressure acts on the half-discs 29a and 29b but since the latter has a larger surface, the overpressure causes the valve to rotate in the direction of the arrow which has the effect of exposing almost the whole of the section of the opening 311.

Instead of using compressed air for pressurising the elastomeric tube 12 or the pilot tube 23, 223 or 323, one can use a liquid, for example a liquid denser than sea water.

In order to depressurise the tube when the laying of the pipeline is completed, it is necessary to aspirate the liquid by means of a tube of small diameter (not shown) extending to a certain distance into the interior of this elastomeric or pilot tube. One could use sea water, provided that an overpressure is maintained at the launching base, for example by connecting the end of the elastomeric or pilot tube to a central tube of a certain height filled with sea water.

FIG. 10 shows an example of an intercommunicating device comprising pyrotechnic means. A pyrotechnic cord 38 coming from the launching base right along the tubular float 402 is connected to a number of matches 39 each of which passes into one of the pipes such as 409a and is connected to a pyrotechnic rupturing device 40 fixed to the adjacent partition 407. Once the laying of the pipeline has been completed, the cord 38 is lit; the latter lights successively the wicks 39 which light the pyrotechnic devices 40 thus destroying the partitions such as 407.

Figure 11:
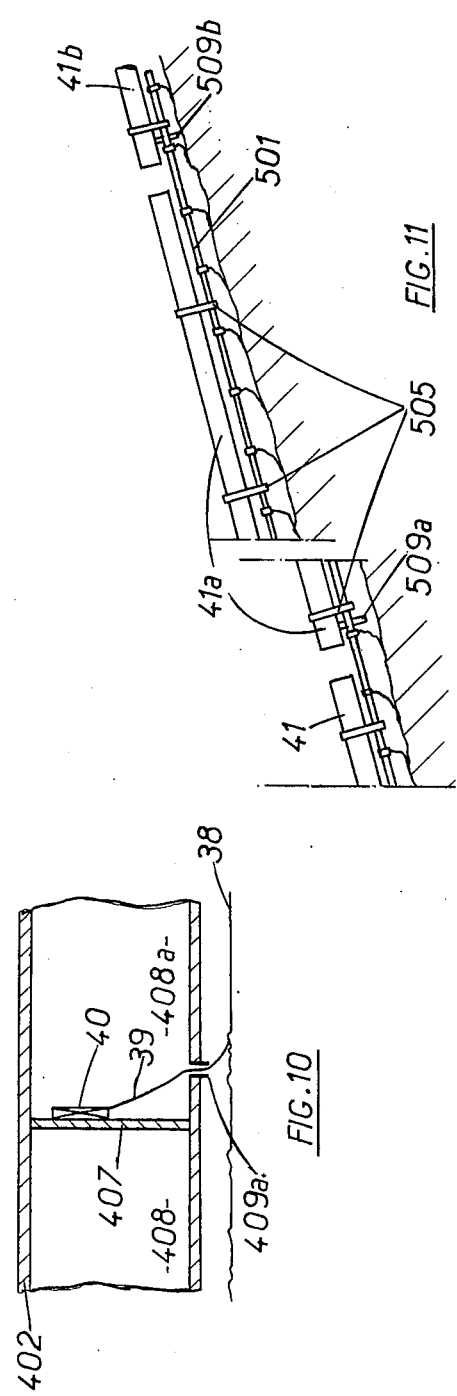
FIG. 11 is a view similar to FIG. 3, showing another embodiment of the float device.

FIG. 11 shows an embodiment in which the float device consists of a plurality of tubes such as 41, 41a, 41b separate from each other and each having a length of several hundred meters or of the order of a kilometer and communicating with the sea by a pipe such as 509a or 509b. Each of these tubes is fixed to the pipeline 501 by a plurality of attachments 505 releasable for example by pyrotechnic means as in U.S. patent application No. 616,018 of Sept. 23, 1975. The tubes are full of light liquid, for example a hydrocarbon, during the laying of the pipeline 501. The attachments 505 are then released so that the pipeline sinks to the bottom and the tubes such as 41, 41a, 41b rise to the surface; they can then be towed to the shore where both the light liquid and the tubes are recovered. It is also possible, as a variant, to release only some of the attachments 505, the others yielding by successive ruptures by the action of the water pressure on the tubes.

The embodiments in which the float device is not a continuous tube, for example those of FIGS. 6 and 11, will advantageously be employed when the pipeline does not have a uniform thickness from one end to the other. Actually, when a pipeline is submerged at a great depth, it is advantageous to adapt its thickness to the pressure to which it is submitted. The sections submerged at a moderate depth will be less thick and thus less heavy, than the sections submerged at great depth. The formation of the float tube in separate sections enables each section to be given a diameter adapted to the weight to be supported.

Figure 12:
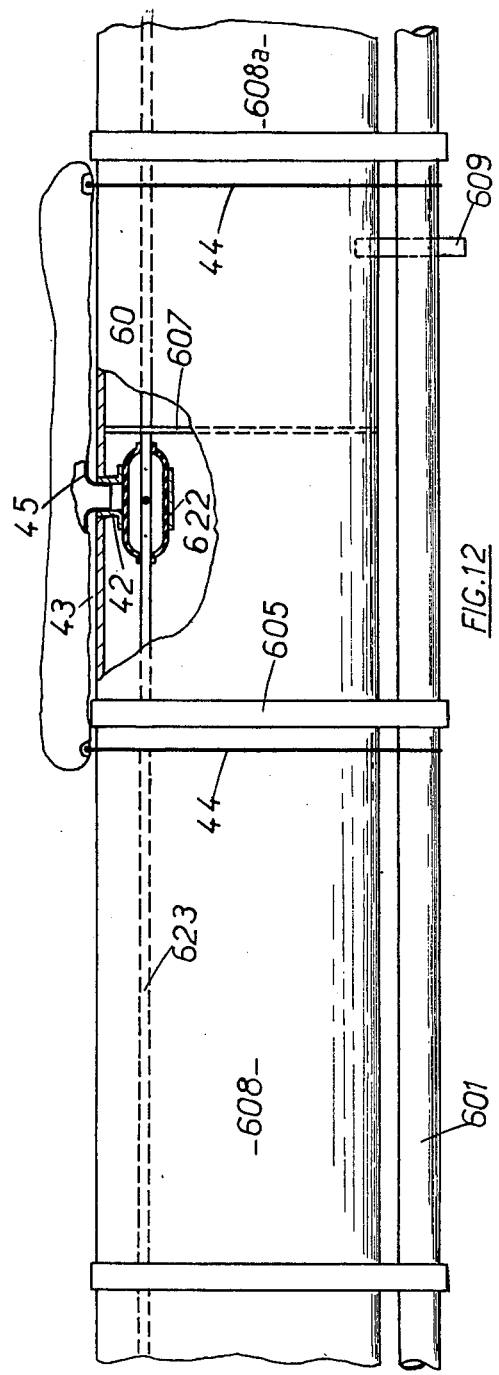
FIG. 12 is a view similar to FIG. 1, showing on a larger scale another method of weighting the float device and of recovering the light liquid.

FIG. 12 shows schematically an embodiment in which each compartment such as 608 is provided with an outlet opening 42 which is normally closed by an inflatable packing 622, similar to the inflatable packing 22 of FIG. 6 and associated with a pilot tube 623 similar to the pilot tube 23, and which communicates with a bottle 43 of elastomeric material fixed to the exterior of the float tube 602 by releasable attachments 44 provided for example with pyrotechnic rupture devices as the attachments 505 of FIG. 11. Once the laying of the pipeline is completed, the pilot tube 623 is placed in communication with the free air which opens the outlet 42. The light fluid is thus driven from the compartment 608 by the sea water entering by a pipe not shown and fills the bottle 43. When all the liquid in the ballast tube has thus passed into the bottles, the release of the attachments 44 is effected from the launching base and the bottles, of which the openings 45 are, for example, simply engaged in the openings 42 as shown, rise to the surface where the light fluid can be recovered.

It goes without saying that the embodiments described are only examples and could be modified, notably by the substitution of technical equivalents or by combining them in different ways without departing from the scope of the invention. In particular, the tube sections 21, 21a, of FIG. 6 could be closed by an elastomeric tube such as the tube 12 of FIGS. 1 to 4; conversely the openings 11a, 11b of FIGS. 1 to 4 could be closed by inflatable packings such as 22, 22a of FIG. 6 in combination with a pilot tube such as 23. Similarly, the slide valves such as 26 (FIG. 7) could be used for closing the tube sections 21, 21a or the openings 11, 11a.

We claim:

1. A float device for use in laying a submarine pipeline from a launching base, comprising tubular means fixed to the pipeline and forming a plurality of compartments therealong, means isolating the compartments from each other, a liquid less dense than water filling the compartments, means opening towards the bottom for putting each compartment into communication with the sea, means for opening passages interconnecting the compartments, an opening at an end of the tubular means situated at the launching base, and means for actuating said opening means by remote control so that the water occupies the compartments progressively while driving the liquid less dense than water towards said opening.

2. A device according to claim 1, in which the tubular means comprise a plurality of tubular floats each forming a compartment, a plurality of pipe sections of smaller diameter than the compartments and forming said passages interconnecting said tubular floats, closing means actuable by remote control for closing said pipe sections and remotely controlled means for actuating said closing means to open said passages.

3. A device according to claim 1, in which said opening means comprise inflatable packings for closing said intercommunicating passages, a pilot tube communicating with the inflatable packings, and means for maintaining at will the pilot tube pressurised, and the remote control means comprise means for maintaining at will the pilot tube depressurised.

4. A device according to claim 3, in which the means for pressurising and depressurising the pilot tube comprise a device for filling the pilot tube with a liquid more dense than water and for aspirating this liquid therefrom.

5. A device according to claim 1, in which said opening means comprise slide valves adapted to close the intercommunicating passages, pressure chambers adapted to control the sliding of said valves, a pilot tube communicating with the pressure chambers and means for subjecting the pilot tube to a first pressure, so as to maintain said valves in a position where they close said intercommunicating passages, and said remote control means comprise means for subjecting the pilot tube to a second pressure in order to cause the valves to slide towards a position in which they open said intercommunicating passages.

6. A device according to claim 5, in which the means for subjecting the pilot tube to a first pressure and to a second pressure comprise a device for filling the pilot tube with a liquid denser than water and for aspirating this liquid therefrom.

7. A device according to claim 1, in which said opening means comprise a plurality of butterfly valves each forming a part of said transverse partitions, each of said valves being urged in the opening direction by the pressure of that of the two adjacent compartments that is farthest from the launching base, and abutment means actuable by remote control for maintaining said valves in the closed position.

8. A device according to claim 7, in which the abutment means comprise sliding abutment elements, pressure chambers for controlling the sliding of said abutment elements, a pilot tube communicating with the pressure chambers, and means for subjecting the pilot tube to a first pressure in order to maintain the abutment elements in a position in which they maintain said valves in the closed position, and remote controlled means comprising means for subjecting the pilot tube to a second pressure in order to cause the abutment elements to slide into a position which frees the valves.

9. A device according to claim 8, in which the means for subjecting the pilot tube to a first pressure and to a second pressure comprise a device for filling the pilot tube with a liquid denser than water and for aspirating the liquid therefrom.

10. A device according to claim 1, in which said opening means comprise pyrotechnic rupture devices adapted to destroy the partitions and said remote control means comprise means for actuating said pyrotechnic rupture devices.

11. A device according to claim 1, in which said means opening towards the bottom consist of non-return valves.

12. A device according to claim 1, in which said means opening towards the bottom consist of hydrodynamic valves.

13. A float device designed for use in laying an undersea pipeline on the seabottom from a launching station, comprising:
tubular means extending along and generally parallel to said pipeline,
fastening means for securing said pipeline and tubular means to each other,
partition means in said tubular means and fast therewith to subdivide the same into a plurality of liquidtight compartments spaced successively along said tubular means,
a lighter-than-water liquid filling said compartments to provide buoyancy thereto, and
downwardly-opening means for communicating each compartment with the ambient sea.

14. A device as claimed in claim 13, wherein said tubular means slopes down from said launching station, whereby each compartment presents a lower-level end portion remote from said launching station and a higher-level end portion closer to said launching station, said downwardly-opening means being located in said lower-level end portion.

15. A device as claimed in claim 14, further comprising an upwardly-opening outlet passage at said higher-level end portion of each compartment, remote control means for selectively blocking or unblocking said outlet passage whereby said outlet passage when unblocked allows ambient water to enter said compartment through said downwardly-opening means and displace upwardly said lighter-than-water liquid filling the same, which liquid issues from said unblocked outlet passage, and means for collecting said liquid as it issues from said outlet passage.

16. A device as claimed in claim 15, wherein said liquid collecting means comprises a container of flexible elastomeric material, and a remote-control releasable connection means for fixing said container to said tubular means.

17. A device as claimed in claim 13, further comprising remote-control means for releasing said fastening means, thereby freeing said tubular means from said pipeline.

* * * * *